US011932833B2

(12) United States Patent
Falk et al.

(10) Patent No.: US 11,932,833 B2
(45) Date of Patent: Mar. 19, 2024

(54) STABLE ACTIVATED PEROXIDE SANITIZING LIQUID COMPOSITIONS WITHOUT ADDED PHOSPHOROUS COMPOUNDS OR CATIONIC SURFACTANTS

(71) Applicant: THE CLOROX COMPANY, Oakland, CA (US)

(72) Inventors: Nancy A. Falk, Pleasanton, CA (US); Timothy P. Mui, Pleasanton, CA (US); Evan Rumberger, Pleasanton, CA (US); Xuanrong Guo, Pleasanton, CA (US); Fanny Frausto, Pleasanton, CA (US); Michael Capracotta, Florham Park, NJ (US); Dennys D. Pena Calderon, Pleasanton, CA (US); David R. Scheuing, Danville, CA (US); Claire E. J. Dentinger, Pleasanton, CA (US); Stephen F. Gross, Florham Park, NJ (US); Nicholas S. Norberg, San Ramon, CA (US); Shakera Thamanna, Florham Park, NJ (US)

(73) Assignee: THE CLOROX COMPANY, Oakland, CA (US)

( * ) Notice: Subject to any disclaimer, the term of this patent is extended or adjusted under 35 U.S.C. 154(b) by 0 days.

(21) Appl. No.: 17/673,191

(22) Filed: Feb. 16, 2022

(65) Prior Publication Data

US 2022/0259523 A1 Aug. 18, 2022

Related U.S. Application Data

(60) Provisional application No. 63/150,812, filed on Feb. 18, 2021.

(51) Int. Cl.
*C11D 3/39* (2006.01)
*C11D 1/722* (2006.01)
(Continued)

(52) U.S. Cl.
CPC ............ *C11D 3/3937* (2013.01); *C11D 1/722* (2013.01); *C11D 3/0047* (2013.01); *C11D 3/222* (2013.01);
(Continued)

(58) Field of Classification Search
CPC ..... C11D 3/3937; C11D 3/0047; C11D 3/222; C11D 17/0008
See application file for complete search history.

(56) References Cited

U.S. PATENT DOCUMENTS 3,929,678 A 12/1975 Laughlin et al.
4,259,217 A 3/1981 Murphy
(Continued)

FOREIGN PATENT DOCUMENTS

EP 0624640 A2 11/1994
EP 0794245 A1 9/1997
(Continued)

*Primary Examiner* — Liam J Heincer
*Assistant Examiner* — M. Reza Asdjodi
(74) *Attorney, Agent, or Firm* — Workman Nydegger

(57) ABSTRACT

Peroxide treatment compositions for use in laundry capable of providing sanitization through the wash e.g., for use with a detergent, where a peroxide activator is stabilized without the presence of phosphorus-containing compounds (e.g., phosphorus-containing stabilizers), through use of a non-ionic surfactant (e.g., alkoxylated alcohol) with a cloud point above 45° C. Use of a single nonionic surfactant, or a surfactant package that may include a small fraction (e.g., less than 0.5%) of sodium lauryl sulfate or another anionic surfactant has been found to be surprisingly effective at stabilizing the peroxide/activator combination, even where water content may be 85% or greater. The composition can have a pH of 5 or less (e.g., 3 to 4). The composition may be free of other anionic surfactants, cationic surfactants, zwitterionic surfactants, amphoteric surfactants, magnesium (Continued)

| | | | Initial | | 2 weeks in Oven | | Heat Stability 49C Visual | | | | | | Comments |
|---|---|---|---|---|---|---|---|---|---|---|---|---|---|
| Example | Base Formula | Active | pH | $H_2O_2$ | pH | $H_2O_2$ | Day 1 | Day 2 | Day 5 | Day 7 | Day 10 | Day 15 | |
| 21 | Lutensol XL 70; Triton [illegible] | [illegible] + NOBS + H2O2 | Incompatible | | | | | | | | | | |
| 22 | | NOBS only | 5.12 | 0.03 | | | | | | | | | |
| 23 | | H2O2 Only | 4.33 | 2.99 | | | | | | | | | |
| 24 | | NOBS H2O2 | 4.28 | 3.00 | | | Failed Visual[1] | | | | | | |
| 25 | [illegible] Citric Acid | NOBS H2O2 | 3.05 | 3.01 | | | PASS | Failed Visual[2] | | | | | |
| 26 | Lutensol XL 80; Sokalan HP 20; Citric Acid | NOBS H2O2 | 3.46 | 2.92 | 3.44 | 3.00 | PASS | PASS | PASS | PASS | PASS | PASS | |
| 27 | [illegible] | NOBS H2O2 | 3.64 | | | | PASS | PASS | Failed Visual[1] (but thermally reversible) | | | | |
| 28 | [illegible] | NOBS H2O2 | 3.33 | | | | PASS | PASS | PASS | | Failed Visual[1] | | |
| 29 | [illegible] Lutensol XL 80; Sokalan HP 20 | NOBS H2O2 | | | | | | | | Failed Visual[1] | | | |
| 30 | [illegible]; Lutensol XL 80 | NOBS H2O2 | | | | | | | | [illegible] | | | |
| 31 | Lutensol XL 80 only | NOBS H2O2 | [illegible] | 2.96 | | | | | | Failed Visual[1] | | | [illegible] |
| 32 | Lutensol XL 80; [illegible] | NOBS [illegible] | 3.51 | 2.95 | | | | | | Failed Visual[1] | | | [illegible] |
| 33 | Lutensol XL 80; Citric Acid | NOBS H2O2 | 3.7 | 2.88 | | | | | | PASS | | PASS | |
| 34 | Lutensol XL 80; Sokalan HP 20 (reduced to .1%) | NOBS H2O2 | 3.49 | 2.93 | | | | | | PASS | | PASS | Effect of HP 20 by adding half (0.2% to 0.1%) |
| 34B | Lutensol XL 80; Sokalan HP 20 (reduced to .1%) + Triton M | NOBS H2O2 | 3.49 | 2.84 | | | | | | | | | |
| 35 | Lutensol XL 80 only + Triton M | NOBS H2O2 | 3.3 | 2.97 | | | | | | PASS | | PASS | HP 20 replaced with Triton M loses effect of HP 20 |
| 36 | Lutensol XL 80 | NOBS H2O2 | 3.84 | ~3.00 | | | | | | PASS | | PASS | |
| 37 | Lutensol XP 90 | | 3.47 | ~3.00 | | | | | | PASS | | PASS | |
| 38 | Lutensol CS 6250 | | 3.72 | ~3.00 | | | | | | PASS | | PASS | |
| 39 | [illegible] | | 3.74 | ~3.00 | | | | | | PASS | | PASS | |
| 40 | [illegible] | | [illegible] | ~3.00 | | | | | | | | Failed Visual[1] | |
| 41 | [illegible] | | 3.62 | ~3.00 | | | | | | PASS | | PASS | |
| 42 | Lutensol LA 60 | | 3.42 | ~3.00 | | | | | | PASS | | PASS | |

Note: all formulations had 3% active H2O2 using 27% active Peroxide
Method: ASTM D2180-89 - Standard Test Method for Active Oxygen in Bleaching compounds
Types of Failure: [1] - Incompatibility: settlement, cloudness, not uniform; [2] - Peracetic Acid generation, uniform milky white solution salts, borates and boric acid, hydroxides, chelating agents, various amine oxides, ethoxylated amines, and the like.

11 Claims, 1 Drawing Sheet

(51) Int. Cl.

| | |
|---|---|
| ***C11D 3/00*** | (2006.01) |
| ***C11D 3/22*** | (2006.01) |
| ***C11D 3/34*** | (2006.01) |
| ***C11D 17/00*** | (2006.01) |

(52) U.S. Cl.
CPC ........ *C11D 3/3409* (2013.01); *C11D 17/0008* (2013.01)

(56) References Cited

U.S. PATENT DOCUMENTS

| | | | | |
|---|---|---|---|---|
| 4,565,647 | A | 1/1986 | Llenado | |
| 5,419,847 | A | 5/1995 | Showell et al. | |
| 5,776,872 | A | 7/1998 | Giret et al. | |
| 5,883,059 | A | 3/1999 | Furman et al. | |
| 5,883,062 | A | 3/1999 | Addison et al. | |
| 5,906,973 | A | 5/1999 | Ouzounis et al. | |
| 5,916,865 | A | 6/1999 | Reinhardt et al. | |
| 6,099,587 | A | 8/2000 | Scialla et al. | |
| 6,235,699 | B1 | 5/2001 | Del Duca et al. | |
| 6,310,025 | B1 | 10/2001 | Del Duca et al. | |
| 6,506,416 | B1 | 1/2003 | Okauchi et al. | |
| 7,863,234 | B2 | 1/2011 | Maki et al. | |
| 9,271,494 | B2 | 3/2016 | Pedersen et al. | |
| 10,750,749 | B2 | 8/2020 | Burke | |
| 2004/0017264 | A1 | 1/2004 | Chang | |
| 2004/0180803 | A1* | 9/2004 | Dixon | C11D 3/42<br>510/375 |
| 2010/0240752 | A1* | 9/2010 | Dreilinger | C11D 3/2086<br>514/557 |
| 2011/0236582 | A1* | 9/2011 | Scheuing | A01N 25/10<br>524/543 |
| 2012/0225943 | A1* | 9/2012 | Gohl | C11D 3/3945<br>510/303 |
| 2013/0067663 | A1 | 3/2013 | Hufnagel et al. | |
| 2014/0336094 | A1* | 11/2014 | Gross | C11D 3/2086<br>510/218 |
| 2015/0052689 | A1* | 2/2015 | Armstrong | C11D 3/43<br>510/200 |
| 2018/0251710 | A1 | 9/2018 | Pijnenburg et al. | |
| 2018/0265808 | A1* | 9/2018 | Gross | C11D 1/94 |
| 2019/0090483 | A1* | 3/2019 | Hanson | A01N 31/02 |
| 2019/0093053 | A1* | 3/2019 | Chan | C11D 3/32 |
| 2020/0154704 | A1* | 5/2020 | Ripberger | C11D 3/43 |
| 2022/0056370 | A1* | 2/2022 | Falk | C11D 3/2079 |
| 2022/0259523 | A1* | 8/2022 | Falk | C11D 3/0047 |

FOREIGN PATENT DOCUMENTS

| | | | |
|---|---|---|---|
| EP | 0826770 | A2 | 3/1998 |
| EP | 0829533 | A1 | 3/1998 |
| EP | 0856577 | A1 | 8/1998 |
| EP | 1967579 | A1 | 9/2008 |
| EP | 2573158 | A1 | 3/2013 |
| JP | 2669590 | B2 | 10/1997 |
| JP | 4252293 | B2 | 4/2009 |
| JP | 6207196 | B2 | 10/2017 |
| WO | 94/28105 | A1 | 12/1994 |
| WO | 2013/043460 | A1 | 3/2013 |

* cited by examiner

| | | | Initial | | 2 weeks in Oven | | Heat Stability 49C Visual | | | | | | Comments |
|---|---|---|---|---|---|---|---|---|---|---|---|---|---|
| Example # | Base Formula | Active | pH | $H_2O_2$ | pH | $H_2O_2$ | Day 1 | Day 2 | Day 5 | Day 7 | Day 10 | Day 15 | |
| 21 | Lutensol XL 70; Trilon BAD | Quats + NOBS + H2O2 | Incompatible | | | | | | | | | | |
| 22 | | NOBS only | 5.12 | 0.03 | | | | | | | | | |
| 23 | | H2O2 Only | 4.38 | 2.99 | | | | | | | | | |
| 24 | | NOBS H2O2 | 4.28 | 3.01 | | | Failed Visual[1] | | | | | | |
| 25 | Water Citric Acid | NOBS H2O2 | 3.05 | 3.04 | | | PASS | Failed Visual[2] | | | | | |
| 26 | Lutensol XL 80; Sokalan HP 20; Citric Acid | NOBS H2O2 | 3.46 | 2.98 | 3.14 | 3.00 | PASS | PASS | PASS | PASS | PASS | PASS | |
| 27 | Lutensol XL 70; Citric Acid | NOBS H2O2 | 3.64 | | | | PASS | PASS | Failed Visual[1] But Thermally reversable | | | | |
| 28 | Lutensol XL 70; Standopol WAQ-LCK; Citric Acid | NOBS H2O2 | 3.33 | | | | PASS | PASS | PASS | | Failed Visual[1] | | |
| 29 | Trilon M Lutensol XL 80 Sokalan HP 20 | NOBS H2O2 | | | | | | | | Failed Visual[1] | | | |
| 30 | Reduced (4%) Lutensol XL 80 | NOBS H2O2 | | | | | | | | Failed Visual1 But Thermally | | | |
| 31 | Lutensol XL 80 only | NOBS H2O2 | 5.78 | 2.96 | | | | | | Failed Visual[1] | | | Effect of pH |
| 32 | Lutensol XL 80 only (1/2 ratio) | NOBS (1.5%) H2O2 (3%) | 3.51 | 2.95 | | | | | | Failed Visual[1] | | | Change ratio of NOBS:H2O2 to 1:2 from 1:3 ratio |
| 33 | Lutensol XL 80; Citric Acid | NOBS H2O2 | 3.7 | 2.98 | | | | | | PASS | | PASS | |
| 34 | Lutensol XL 80; Sokalan HP 20 (reduced to .1%) | NOBS H2O2 | 3.49 | 2.93 | | | | | | PASS | | PASS | Effect of HP 20 by adding half (0.2% to 0.1%) |
| 34B | Lutensol XL 80; Sokalan HP 20 (reduced to .1%); + Trilon M | NOBS H2O2 | 3.49 | 2.94 | | | | | | | | | |
| 35 | Lutensol XL 80 only + Trilon M | NOBS H2O2 | 3.3 | 2.97 | | | | | | PASS | | PASS | HP 20 replaced with Trilon M to see effect of HP 20 |
| 36 | Lutensol XL 90 | NOBS H2O2 | 3.84 | ~ 3.00 | | | | | | PASS | | PASS | |
| 37 | Lutensol XP 90 | | 3.47 | ~ 3.00 | | | | | | PASS | | PASS | |
| 38 | Lutensol CS 6250 | | 3.72 | ~ 3.00 | | | | | | PASS | | PASS | |
| 39 | Plurafac SL 62 | | 3.74 | ~ 3.00 | | | | | | PASS | | PASS | |
| 40 | Lutensol TDA 8 90% | | 3.8 | ~ 3.00 | | | | | | | | Failed Visual[1] | |
| 41 | Lutensol A65N | | 3.62 | ~ 3.00 | | | | | | PASS | | PASS | |
| 42 | Lutensol LA 60 | | 3.42 | ~ 3.00 | | | | | | PASS | | PASS | |

Note: all formulations had 3% active H2O2 using 27% active Peroxide
Method: ASTM D2180-89 - Standard Test Method for Active Oxygen in Bleaching compounds
Types of Failure: [1] - Incompatibility: settlement, cloudness, not uniform; [2]- Peracetic Acid generation, uniform milky white solution

STABLE ACTIVATED PEROXIDE SANITIZING LIQUID COMPOSITIONS WITHOUT ADDED PHOSPHOROUS COMPOUNDS OR CATIONIC SURFACTANTS

CROSS REFERENCE TO RELATED APPLICATIONS

The present application claims the benefit of U.S. Provisional Patent Application Ser. No. 63/150,812, filed on Feb. 18, 2021, the disclosure of which is incorporated by reference in its entirety.

BACKGROUND OF THE INVENTION

1. The Field of the Invention

The present invention is generally related to aqueous compositions for use in laundering clothing and other fabrics, particularly compositions for use in improving stain removal through pretreatment and/or during washing, while at the same time providing sanitization through the wash.

2. Description of Related Art

Various stain removal treatments are available for laundry use applications. Many such treatment compositions are added to the wash water used to wash such fabrics, or are used in pre-treating such fabrics prior to washing within the wash water. While numerous treatment compositions are available, there exists a continuing need for pre-treatment and other compositions providing improved benefits. For example, while many stain removal treatment compositions are available, there are few if any available that also provide an antimicrobial benefit when added to the wash water. It would be a further benefit if such a composition could be used at the consumers choice as (1) a pre-treatment applied directly to fabrics to remove stains and/or (2) as a wash-cycle additive to provide enhanced stain removal performance as compared to the detergent alone. In either case, whether the composition were applied as a pre-treatment, or added to the wash-water during the wash cycle, it would be particularly advantageous for the composition to not only provide stain removal, but to also provide an antimicrobial benefit (e.g., sanitization) of the fabric articles being laundered.

BRIEF SUMMARY OF THE INVENTION

The present invention is directed to treatment compositions useful as a pre-treatment to a washing step (e.g., as a laundry pre-treatment), useful in boosting stain removal during washing (e.g., when added to the wash water), or both. The compositions advantageously provide sanitization during washing, e.g., whether used as a pre-treatment, or added to the wash water during the wash cycle. In an embodiment, the treatment composition includes water, a peroxide, an alkanoyl oxybenzene sulfonate (e.g., NOBS) peroxide activator, and an alkoxylated alcohol or other nonionic surfactant with a cloud point above 45° C., which surfactant alone is surprisingly capable of stabilizing the peroxide and peroxide activator in the aqueous composition, e.g., without the need for any phosphorus-containing or similar stabilizers. The composition has a pH of 5 or less (e.g., 2 to 5, or 3 to 4). Such compositions can exhibit stability (e.g., phase stability, as well as peroxide stability) for an extended period of time, such as at least 3 months, at least 6 months, at least 9 months, or at least 12 months. Such stability is surprisingly and advantageously achieved without inclusion of any phosphorus-containing stabilizers or other phosphorus containing compounds in contrast to various other superficially similar appearing compositions, such as those exemplified by JP2669590 to Kao and U.S. Pat. No. 5,419,847 to Showell.

In an embodiment, the present treatment compositions may be free of phosphorus-containing stabilizers, other phosphorus-containing components, cationic surfactants, zwitterionic surfactants (e.g., betaines and the like), amphoteric surfactants, sulfonates (e.g., sodium alkane sulfonates) other than the alkanoyl oxybenzene sulfonate peroxide activator, quaternary ammonium compounds or other cationic surfactants, magnesium salts, borates or boric acid, hydroxides, EDTA and other chelating agents, amine oxides (e.g., alkyl amine oxides) such as lauryl dimethyl amine oxide and myristyl dimethyl amine oxide, and ethoxylated amines, to name a few.

As described herein, while some embodiments may include a small concentration of an anionic surfactant, the compositions may not include large fractions of such anionic surfactants (e.g., less than 1%, or no more than 0.5%, or even 0.3%). The present compositions may further be free from any additional components not specifically mentioned herein. In an embodiment, the present compositions may include only the alkanoyl oxybenzene sulfonate (e.g., NOBS) peroxide activator, rather than relying on the presence of two or more peroxide activators, or other activators such as amino tri(methylene phosphonic acid) (ATMP), or caprolactam activators.

The treatment compositions may advantageously provide at least a 2 log, or at least a 3 log reduction against a bacterial population (e.g., *Staphylococcus aureus, Klebsiella pneumonia*, or the like) when used through the wash. For example, such through the wash treatment typically exhibits a dilution factor that may be at least 100×, e.g., reducing the peroxide concentration to a value that may be less than 1000 ppm, or less than 600 ppm (e.g., such as from 34 ppm to 550 ppm, from 80 ppm to 550 ppm, from 200 ppm to 550 ppm, from 100 ppm to 550 ppm, from 150 ppm to 400 ppm, from 150 ppm to 300 ppm, or from 150 to 250 ppm). By way of example, the Examples described below in conjunction with Example 1 in the Examples section, evaluated under ASTM E2274 (for top load washers) and ASTM E2406 (for high efficiency washers), included peroxide concentrations of 150 to 200 ppm. Even in such dilute conditions, the present compositions can be effective to achieve a 2 or 3 log reduction in a target bacterial population, without the presence of the various components often included in existing treatment compositions including NOBS and peroxide, where stabilization is simply achieved with sufficient concentration of just the alkoxylated alcohol or other nonionic surfactant with the cloud point characteristics described herein.

Another exemplary treatment composition may include water (e.g., accounting for 80% or more, or 85% or more of the composition), 0.1% to 15% by weight of a peroxide, 0.5% to 2% by weight of an alkanoyl oxybenzene sulfonate (e.g., NOBS) peroxide activator, 2% to 10% by weight of a nonionic alkoxylated alcohol surfactant (e.g., an alkyl polyethylene glycol ether) with a cloud point above 45° C., and less than 0.5% (or 0.3%) by weight of an anionic surfactant such as sodium lauryl sulfate, to enhance the antimicrobial efficacy of the composition while still maintaining stability. The composition has a pH of 5 or less (e.g., 2 to 5, or 3 to 4). The composition may typically further include an acidic pH adjusting agent, and optionally a polysaccharide gum thickener that is stable in acidic conditions. Where the anionic surfactant is included to enhance microefficacy, its content may be minimal by comparison to the nonionic surfactant which stabilizes the peroxide and peroxide activator combination. For example, a ratio of the nonionic to anionic surfactant may be at least 5:1, or at least 10:1, such as from 10:1 to 30:1. The composition may be free from phosphorus-containing stabilizers, other phosphorus-containing components, cationic surfactants, zwitterionic surfactants (e.g., betaines and the like), amphoteric surfactants, sulfonates (e.g., sodium alkane sulfonates) other than the alkanoyl oxybenzene sulfonate (e.g., NOBS) peroxide activator, quaternary ammonium compounds or other cationic surfactants, magnesium salts, borates or boric acid, hydroxides, EDTA and other chelating agents, amine oxides (e.g., alkyl amine oxides) such as lauryl dimethyl amine oxide and myristyl dimethyl amine oxide, and ethoxylated amines, activators other than NOBS such as amino tri(methylene phosphonic acid) (ATMP), or caprolactam activators to name a few. The present compositions may further be free from any additional components not specifically mentioned herein. The composition may provide at least a 3 log reduction against one or more target microbes when used through the wash. Advantageously, the composition may provide both phase and peroxide stability for a period of at least 3 months, at least 6 months, at least 9 months, or at least 12 months. By way of example, peroxide retention may be at least 50%, at least 70%, at least 80%, or at least 90% during such time frame, under typical ambient temperature storage conditions.

Another embodiment is directed to a liquid antimicrobial laundry treatment composition that is stabilized without the use of phosphorus-containing stabilizers, the composition consisting of water (e.g., 80% or more, or 85% or more), 0.1% to 15% by weight of a peroxide, 0.5% to 2% by weight of the alkanoyl oxybenzene sulfonate (e.g. NOBS) peroxide activator, 2% to 10% by weight of an alkoxylated alcohol or other nonionic surfactant with a cloud point above 45° C., wherein the composition has a pH of 5 or less. The composition may optionally include a small amount (e.g., up to 0.5%, or up to 0.3%) of an anionic surfactant (e.g., SLS), an organic or inorganic acid pH adjusting agent; and/or a polysaccharide gum thickener that is stable in acidic conditions. Optionally, one or more of an optical brightener, an enzyme that is stable in the presence of acid and peroxide, a dye, colorant or pigment, a fragrance or perfume, a solvent, a co-surfactant, a hydrotrope, a stain and soil repellant, a lubricant, a solubilizing, agent, a stabilizer, a defoamer, a preservative, or a buffer may be present. The composition provides at least a 2 or at least a 3 log reduction against a bacterial population when used "through the wash", and the composition provides phase and peroxide stability over a period of at least 3, 6, 9 or 12 months.

The composition typically includes a majority water (e.g., more than 50%, more than 60%, more than 70%, more than 75%, such as 80-90% water). Other than the peroxide, the composition may be free of other oxidizing agents (e.g., hypohalites, or other oxidizing or bleaching agents). As noted above, the composition may be free of chelating agents (e.g., EDTA and similar molecules (e.g., diammonium ethylenediaminetetraacetate), or other sequestrants). While citric acid may be included as a pH adjusting agent in the present formulations, it is not typically included as a sequestrant or chelating agent. One particularly important advantage of the present formulations is that the formulations do not include phosphonate or other phosphorus-containing stabilizers, or any other phosphorus containing components, for any purpose. While such phosphorus-containing components can be quite effective at stabilization as evidenced by JP2669590 to Kao, they are responsible for algal blooms and other related undesirable environmental problems. Similarly, while other peroxide activators are known, such as amino tri(methylene phosphonic acid) ("ATMF"), N-acyl caprolactams, and others, in at least one embodiment, the only peroxide activator included in the present formulations is nonanoyloxybenzenesulfonate ("NOBS"), e.g., such as a sodium salt thereof.

In an embodiment, a polymeric anti-redeposition agent or suspension agent such as a cationic polyethylene imine polymer, an ethoxylated polyethyleneimine polymer or the like may be present. Although such a polyethylene imine polymer may technically be cationic, it is not included as a cationic surfactant, but as an anti-redeposition agent, to aid in soil removal and suspension. Where included, such is present in amounts of less than 1% (e.g., less than 0.8%, less than 0.7%, or less than 0.6% by weight). Such cationic polymers differ from cationic surfactants which are excluded from the present formulations in that such cationic polymers are of significantly greater molecular weight (as they are polymers). For example, excluded cationic surfactants are typically of far lower molecular weights than any cationic polymers (e.g., less than 5,000, less than 3,000, less than 1,000, or less than 500 Daltons). Other differences include that their cationic charge is not fixed (as compared to, e.g., quaternary amine surfactants), but can depend on pH.

Examples of other possible adjuncts include a pH adjusting agent, a thickener, an optical brightener, an enzyme that is stable in the presence of acid and peroxide, a dye, colorant or pigment, a fragrance or perfume, a solvent, a co-surfactant, a hydrotrope, a stain and soil repellant, a lubricant, a solubilizing agent, a stabilizer, a defoamer, a preservative, or a buffer may be present.

Another aspect of the present disclosure relates to a method of treating a fabric including contacting the fabric (e.g., soiled or otherwise stained) with any of the treatment compositions described herein. The terms "soil" and "stain" are used interchangeably herein. In an embodiment, the contacting occurs before washing the fabric (i.e., the treatment composition is applied as a pre-treatment to later contemplated washing). In another embodiment, the contacting occurs at the time the fabric is washed (e.g., by adding the treatment composition to the wash water), so that the treatment composition is used to boost stain removal performance beyond that provided by a detergent composition alone.

Further features and advantages of the present invention will become apparent to those of ordinary skill in the art in view of the detailed description of preferred embodiments below.

BRIEF DESCRIPTION OF THE DRAWINGS

To further clarify the above and other advantages and features of the present invention, a more particular description of the invention will be rendered by reference to specific embodiments thereof which are illustrated in the drawings located in the specification. It is appreciated that these drawings depict only typical embodiments of the invention and are therefore not to be considered limiting of its scope. The invention will be described and explained with additional specificity and detail through the use of the accompanying drawings.

FIG. 1 shows several exemplary compositions evaluating compatibility of various components, as well as phase and peroxide stability.

DETAILED DESCRIPTION OF THE PREFERRED EMBODIMENTS

I. Definitions

Before describing the present invention in detail, it is to be understood that this invention is not limited to particularly exemplified compositions, systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

It must be noted that, as used in this specification and the appended claims, the singular forms "a," "an" and "the" include plural referents unless the content clearly dictates otherwise.

Numbers, percentages, ratios, or other values stated herein may include that value, and also other values that are about or approximately the stated value, as would be appreciated by one of ordinary skill in the art. A stated value should therefore be interpreted broadly enough to encompass values that are at least close enough to the stated value to perform a desired function or achieve a desired result, and/or values that round to the stated value. The stated values include at least the variation to be expected in a typical manufacturing or formulation process, and may include values that are within 10%, within 5%, within 1%, etc. of a stated value.

All numbers expressing quantities of ingredients, constituents, reaction conditions, and so forth used in the specification and claims are to be understood as being modified in all instances by the term "about". Notwithstanding that the numerical ranges and parameters setting forth the broad scope of the subject matter presented herein are approximations, the numerical values set forth in the specific examples are reported as precisely as possible. Any numerical value, however, inherently contains certain errors necessarily resulting from the standard deviation found in their respective testing measurements.

Some ranges may be disclosed herein. Additional ranges may be defined between any values disclosed herein as being exemplary of a particular parameter. All such ranges are contemplated and within the scope of the present disclosure.

In the application, effective amounts are generally those amounts listed as the ranges or levels of ingredients in the descriptions, which follow hereto. Unless otherwise stated, amounts listed in percentage ("%'s") are in weight percent (based on 100% active) of the treatment composition.

The phrase 'free of' or similar phrases as used herein means that the composition comprises 0% of the stated component, that is, the component has not been intentionally added to the composition. However, it will be appreciated that such components may incidentally form, under some circumstances, as a byproduct or a reaction product from the other components of the composition, or such component may be incidentally present within an included component, e.g., as an incidental contaminant.

The phrase 'substantially free of' or similar phrases as used herein means that the composition preferably comprises 0% of the stated component, although it will be appreciated that very small concentrations may possibly be present, e.g., through incidental formation, as a byproduct or a reaction product from the other components of the composition, incidental contamination, or even by intentional addition. Such components may be present, if at all, in amounts of less than 1%, less than 0.5%, less than 0.25%, less than 0.1%, less than 0.05%, less than 0.01%, less than 0.005%, or less than 0.001%.

The compositions described herein may provide sanitization. As used herein, the term "sanitize" shall mean the reduction of contaminants in the inanimate environment to levels considered safe according to public health ordinance, or that reduces the bacterial population by significant numbers where public health requirements have not been established. By way of example, an at least 99% reduction (2-log reduction) in bacterial population within a 1 hour time period is deemed "significant." Greater levels of reduction are possible, as are faster treatment times (e.g., within a 10-20 minute wash cycle), when sanitizing through the wash, as is presently contemplated. In contrast, the term "disinfect" is more typically reserved for a more complete antimicrobial treatment, e.g., including the elimination of many or all pathogenic microorganisms on surfaces with the exception of bacterial endospores. In further contrast, the term "sterilize" typically refers to the complete elimination or destruction of all forms of microbial life. Some embodiments of the present compositions provide for at least a 2 log, or at least a 3 log reduction in bacterial population within a designated time period (e.g., within a 10-20 minute wash cycle or the like). A 2-log reduction is equivalent to a 99% reduction, a 3-log reduction is equivalent to at least a 99.9% reduction, etc.

The presently claimed compositions are both phase stable, and exhibit peroxide stability. By phase stable, it is meant that the compositions are clear (except for intentional inclusion of a pigment, colorant, or dye), rather than exhibiting any undesirable precipitation or phase separation of components. By peroxide stability, it is meant that the amount of peroxide within the treatment compositions remains sufficiently stable, over the shelf life (e.g., at least 3 months, at least 6 months, at least 9 months, or at least 12 months) of the composition, to provide the desired sanitization. By way of example, at least 50%, at least 60%, at least 70%, at least 80%, or at least 90% of the initial peroxide concentration may remain, after such time period, under storage at ambient temperature (e.g., 20-30° C., such as 25° C.) conditions. As will be appreciated by those of skill in the art, peroxide stability can be evaluated using various techniques to determine the concentration of peroxide remaining after a given storage period at such temperature, e.g., using any of various titration methods (e.g., ASTM 2180-17.

Any reference to ASTM or other standardized tests refers to the latest update to any such standard, unless otherwise indicated. Any such referenced standards are herein incorporated by reference in their entirety.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

II. Introduction

The present invention is directed to treatment compositions for use in laundry. In particular, in addition to effectively removing stains as compared to detergent alone, both through the wash and as a pre-treatment, the present compositions advantageously further provide a sanitization benefit. The compositions advantageously are capable of such without the use of chlorine bleach or oxidizing agents other than the included peroxide. As such, the compositions are safe to use on a wide variety of fabrics and dyes. Using the present compositions provides a very convenient way to sanitize fabrics through the wash, by simply adding the present compositions to the wash water (e.g., at the start of the wash cycle), or as a spotter pre-treatment. It will be apparent that such compositions can be used in a variety of ways, e.g., added to wash water, added to rinse water, e.g., after completion of a wash cycle in a washing machine, added to water used to soak articles being laundered, as a pre-treatment contacted directly with the article being treated, etc. Such compositions may be used alone, or with another treatment composition (e.g., with laundry detergent, fabric softeners, fragrance beads, etc.). All such and similar uses are contemplated, and are within the scope of the term "through the wash", as used herein. In an embodiment, the composition is separate from any such laundry detergent or other treatment composition, e.g., although the composition may be compatible for use with such treatment compositions. In another embodiment, the composition could be formulated to be one and the same, with a laundry detergent, or any other such treatment composition, so as to provide sanitization to such treatment composition, in addition to whatever other benefits such treatment composition may provide.

The composition may be free of one or more of hypohalites (e.g., hypochlorites) and other chlorine oxidants, certain enzymes (e.g., those that are not stable under acidic conditions), phosphorous-containing stabilizers, other phosphorus containing compounds, quaternary ammonium compounds and other cationic surfactants, zwitterionic surfactants (e.g., betaines and the like), amphoteric surfactants, sulfonates (e.g., sodium alkane sulfonates) other than the alkanoyl oxybenzene sulfonate (e.g., NOBS) peroxide activator, magnesium salts, borates and boric acid, hydroxides, chelating agents, amine oxides (e.g., alkyl amine oxides) such as lauryl dimethyl amine oxide or myristyl dimethyl amine oxide, and ethoxylated amine polymers. As described herein, while some embodiments may include a small concentration of an anionic surfactant, the presence of such may be quite limited, (e.g., no more than 0.5%), as compared to the nonionic encapsulating surfactant. The compositions may be free from non-NOBS activators such as amino tri(methylene phosphonic acid) (ATMP), or caprolactam activators. As noted herein, the compositions may also be free from other components not mentioned as present, e.g., such as lower alcohol solvents (e.g., $C_1$-$C_4$ alcohols), or numerous other additives included in existing compositions.

The compositions may advantageously include water and a peroxide in combination with NOBS as a peroxide activator, with a nonionic surfactant, such as an alkoxylated alcohol surfactant (e.g., a nonionic alkyl polyethylene glycol ether). The nonionic surfactant exhibits particular cloud point characteristics, such that the nonionic surfactant is configured to encapsulate the NOBS molecule, to stabilize and prevent premature reaction of the NOBS with the peroxide in the composition that includes a majority water.

Those of skill in the art will appreciate that cloud point is a property associated with non-ionic surfactants. Various methods of determining cloud point will be apparent to those of skill in the art, any of which methods may be used. By way of example, the selected nonionic surfactant may exhibit a cloud point above 45° C., above 50° C., less than 90°, less than 80° C., less than 70° C., such as from 50° C. to 60° C. For example, the cloud point for a given surfactant corresponds to the temperature above which the sample becomes turbid. According to one method, a 1% dilution of a given surfactant in water may be used, which is initially transparent. Upon reaching the cloud point, the solution becomes turbid. Various devices are available for automatically determining cloud point using such or similar methods, and will be apparent to those of skill in the art.

The composition has an acidic pH, e.g., no more than 5, such as from 3 to 4. A pH adjusting agent (e.g., an organic or inorganic acid) may be included to achieve the desired pH, to ensure stability of the composition, and its microefficacy.

One or more various other optional components may be included, such as a thickener, an optical brightening agent, an enzyme stable under the composition conditions, additional surfactant or a co-surfactant a hydrotrope, a fragrance or perfume a dye, colorant or pigment, a stain and soil repellant, a lubricant, a solubilizing agent, a suspension or anti-redisposition agent, a stabilizer, a defoamer, a preservative, a buffer, or combinations thereof.

Even where one or more optional components are included, typically the concentration of ingredients other than water is quite low, such that the water may comprise at least 50%, at least 60%, at least 70%, at least 75%, at least 80%, or at least 85% (e.g., 80% to 90%) by weight of the composition. The nonionic surfactant which is able to prevent or minimize perhydrolysis of the NOBS activator in the presence of the peroxide may be the second most present ingredient, after the water. The water included in the composition may be deionized water, or water which is otherwise softened to reduce or substantially eliminate the presence of undesirable ions (e.g., particularly metal ions such as, but not limited to copper, iron, magnesium, calcium, and the like). For similar reasons that the composition may advantageously be free of magnesium salts, the composition may generally be free from various other metal salts (e.g., including, but not limited to iron, copper, calcium, and the like, as such salts or ions may undesirably prematurely react with the peroxide present in the composition). It can be important to minimize the presence of any such salts or ions, particularly as the compositions typically do not include a chelating agent.

III. Exemplary Treatment Compositions

A. Peroxide

The treatment composition advantageously includes a peroxide, such as hydrogen peroxide, although it will be appreciated that other peroxides could alternative be used. For example, peroxides other than hydrogen peroxide, or materials that generate a peroxide in aqueous conditions may include carbamide peroxide, sodium perborate, or sodium percarbonate. In an embodiment, the peroxide may be present within the present composition in an amount from 0.1% to 15%, 0.1% to 10%, 0.5% to 5%, 1% to 4%, or 1% to 3% by weight of the composition.

B. Peroxide Activator

The treatment composition advantageously includes an alkanoyl oxybenzene sulfonate peroxide activator, such as nonanoyloxybenzene sulfonate (NOBS). NOBS with a sodium counterion has the structure shown below.

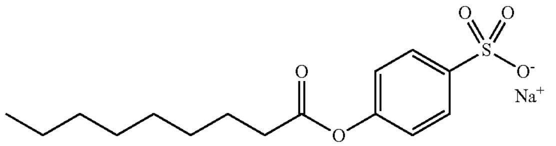 [SMILES: CCCCCCCCC(=O)Oc1ccc(S(=O)(=O)[O-])cc1 ; [Na+]]

It will be appreciated that other alkanoyl oxybenzene sulfonates, e.g., with different alkyl chain lengths may also be suitable for use. For example, the alkyl chain length could vary from 4 to 18 carbon atoms, from 6 to 14 carbon atoms, or from 8 to 12 carbon atoms.

In the presence of peroxide in aqueous conditions, NOBS becomes a peracid, which peracid can be a very effective sanitizing agent, as shown below.

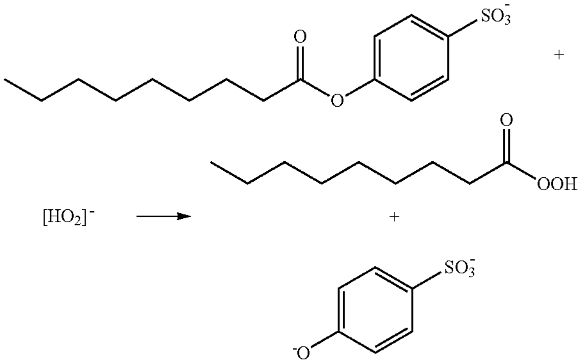

The main difficulty with incorporation of NOBS into aqueous liquid peroxide compositions is that stability and compatibility of NOBS in solution with peroxide is challenging, because of its reactivity with the peroxide component in the composition. Many previous attempts at stabilization have relied on the inclusion of phosphonate or other phosphate-containing stabilizers within the formulation, to achieve suitable stability. For example, in U.S. Pat. No. 5,419,847, all examples include DEQUEST phosphonate stabilizers/chelating agents, and in JP2669590 all examples with significant stability rely on phosphate-containing stabilizers. While such phosphate-containing components may be effective in stabilizing the NOBS and peroxide combination, their inclusion in laundry treatment compositions is problematic from an environmental and current regulatory perspective.

Previously, it was thought that complexation with a cationic surfactant was required to achieve acceptable stability. As described herein, Applicant has surprisingly found that it is possible to stabilize aqueous compositions including both NOBS and a peroxide, with specific selection of a nonionic surfactant, e.g., such as an alkyl polyethylene glycol ether in sufficient molar ratio relative to the NOBS, to encapsulate and protect the NOBS from premature reaction with the peroxide. Where such nonionic surfactant has a cloud point above 45° C., excellent peroxide and phase stability can be achieved.

By way of example, the formulation may include from 0.1% to 5%, from 0.25% to 4%, from 0.3% to 3%, or from 0.5% to 2% alkanoyl oxybenzene sulfonate peroxide activator. In an embodiment, the molar ratio of NOBS to non-ionic surfactant may vary widely, e.g., from 1:1 to 1:10

C. Nonionic Surfactant

The compositions advantageously include a nonionic surfactant configured to encapsulate and protect the NOBS, preventing or minimizing premature reaction thereof with the peroxide component also present in the composition. In an embodiment, the nonionic surfactant has a cloud point above 45° C., which is an important characteristic in ensuring that the composition exhibits the desired phase and peroxide stability characteristics. Avoiding inclusion of various components as described herein which interfere with phase stability is also important. In an embodiment, the nonionic surfactant is an alkoxylated alcohol surfactant. In one embodiment, the alkoxylated alcohol surfactant may be branched. Examples of suitable alkoxylate surfactants include branched, nonionic alkyl polyethylene glycol ethers made from Guerbet alcohols (e.g., a $C_{10}$ Guerbet alcohol) and ethylene oxide. It will be apparent that alkylene oxides (e.g., propylene oxide) other than ethylene oxide may also be suitable for use. In an embodiment, a combination of ethylene oxide and propylene oxide may be used. As will be appreciated by those of skill in the art, Guerbet alcohols may have the structure shown below:

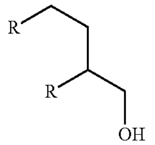

Where R is an alkyl group (e.g., as derived from a primary aliphatic alcohol in a Guerbet reaction). In an embodiment, each R may independently represent an alkyl group having from 3 to 22, from 6 to 18, from 6 to 16, from 6 to 14, or from 8 to 12 carbon atoms (e.g., $C_3$, $C_4$, $C_6$, $C_8$, $C_{10}$, $C_{12}$, $C_{14}$, $C_{16}$, $C_{18}$, $C_{20}$, or any value or range defined between two of any such carbon numbers). In an embodiment, both R groups may be identical, although in other embodiments they may differ from one another.

Exemplary branched nonionic alkyl polyethylene glycol ethers (e.g., made from a Cm Guerbet alcohol and 2 different alkylene oxides, namely ethylene oxide and propylene oxide) include the LUTENSOL® XL series of surfactants, such as LUTENSOL® XL 40, LUTENSOL® XL 50, LUTENSOL® XL 60, LUTENSOL® XL 70, LUTENSOL® XL 79, LUTENSOL® XL 80, LUTENSOL® XL 89, LUTENSOL® XL 90, LUTENSOL® XL 99, LUTENSOL® XL 100, and LUTENSOL® XL 140, available from BASF® Corporation (Florham Park NJ). The LUTENSOL® XP series of surfactants available from BASF® Corporation may also be suitable for use. A combination of different branched nonionic alkyl polyethylene glycol ethers may be used, although in an embodiment, a single nonionic surfactant (e.g., an alkyl polyethylene glycol ether as noted above) is either the only surfactant, or makes up the vast majority of any surfactant package (e.g., where another surfactant may be included, but at a ratio of no more than 1:10 relative to the principal nonionic surfactant). For example, as described herein, a small amount of an anionic surfactant (e.g., an alkyl sulfate such as sodium lauryl sulfate) may be present, not so much for any purpose of encapsulating the NOBS activator, but for improved microefficacy. Use of the term "surfactant package" as used herein does not require more than a single surfactant. For example, the surfactant package includes at least a nonionic surfactant as described herein. Other surfactants may be included in the surfactant package, in addition to the principal nonionic surfactant.

Some linear nonionic alcohol ethoxylate or other alkoxylate surfactants may also be suitable for use as the alkoxylate surfactant. Examples of such include the SURFONIC® L series of surfactants, particularly the SURFONIC® L12 series of surfactants (e.g., lauryl alcohol ethoxylates). An example of such is SURFONIC® L12-8, available from HUNTSMAN® Corporation (Woodlands, TX). Other examples of alkoxylate surfactants include the PLURAFAC® series of surfactants, such as PLURAFAC® SL-62, available from BASF® Corporation. Alcohol ethoxylate surfactants may be made by reaction of a primary or secondary alcohol (e.g., $C_4$ to $C_{22}$, $C_6$ to $C_{18}$, $C_8$ to $C_{16}$) with ethylene oxide ($C_2H_4O$). Often the number of moles of ethoxylation is proprietary to the surfactant manufacturer, although this degree of ethoxylation is often from 4 moles to 12 moles, or from 6 moles to 10 moles. Other alcohol ethoxylate surfactants that may be suitable for use are available from STEPAN®, DOW®, and others.

By way of example, LUTENSOL® XL 70, LUTENSOL® XL 80, LUTENSOL® XL 90, and SURFONIC® L12-8 have moles of ethoxylation values of 7, 8, 9, and 8, respectively. Higher moles of ethoxylation may aid in raising the cloud point of the composition.

The alkoxylate surfactant may have a hydrophilic-lipophilic balance ("HLB") value from 11 to 14. For example, LUTENSOL® XL 70, LUTENSOL® XL 80, LUTENSOL® XL 90, and PLURAFAC® SL-62 have HLB values of 12, 13, 14, and 14, respectively. Where a blend of a plurality of alkoxylate surfactants is used, one of the alkoxylate surfactants may have more moles of ethoxylation and/or a higher HLB value than another of the included alkoxylate surfactants.

Additional examples of nonionic surfactants that may be suitable include, but are not limited to, other alcohol alkoxylates, alkyl glucosides and alkyl pentosides, alkyl glycerol esters, alkyl ethoxylates, and alkyl and alkyl phenol ethoxylates of all types, poly alkoxylated (e.g. ethoxylated or propoxylated) $C_6$-$C_{12}$ linear or branched alkyl phenols, $C_6$-$C_{22}$ linear or branched aliphatic primary or secondary alcohols, and $C_2$-$C_8$ linear or branched aliphatic glycols. Block or random copolymers of $C_2$-$C_6$ linear or branched alkylene oxides may also be suitable nonionic surfactants. Capped nonionic surfactants in which the terminal hydroxyl group is replaced by halide; $C_1$-$C_8$ linear, branched or cyclic aliphatic ether; $C_1$-$C_8$ linear, branched or cyclic aliphatic ester; phenyl, benzyl or $C_1$-$C_4$ alkyl aryl ether; or phenyl, benzyl or $C_1$-$C_4$ alkyl aryl ester may also be used. Sorbitan esters and ethoxylated sorbitan esters may also be useful nonionic surfactants. Other suitable nonionic surfactants may include mono or polyalkoxylated amides of the formula $R^1CONR^2R^3$ and amines of the formula $R^1NR^2R^3$ wherein $R^1$ is a $C_5$-$C_{31}$ linear or branched alkyl group and $R^2$ and $R^3$ are $C_1$-$C_4$ alkyl, $C_1$-$C_4$ hydroxyalkyl, or alkoxylated with 1-3 moles of linear or branched alkylene oxides. Biosoft 91-6 (Stepan Co.) is an example of an alkyl ethoxylate (or alcohol ethoxylate) having a methylene chain length of $C_9$ to $C_{11}$ with an average of 6 moles of ethoxylation. An example of an alcohol ethoxylate is ECOSURF EH-9, which is more specifically an ethylene oxide-propylene oxide copolymer mono(2-ethylhexyl) ether, available from Sigma-Aldrich.

Alkylpolysaccharides that may be suitable for use herein are disclosed in U.S. Pat. No. 4,565,647 to Llenado, having a linear or branched alkyl, alkylphenyl, hydroxyalkyl, or hydroxyalkylphenyl group containing from 6 to 30 carbon atoms and a polysaccharide, e.g., a polyglycoside, hydrophilic group containing from 1.3 to 10 saccharide units. Suitable saccharides include, but are not limited to, glucosides, galactosides, lactosides, and fructosides. Alkylpolyglycosides may have the formula: $R^2O(CnH_{2n}O)_t(\text{glycosyl})_x$ wherein $R^2$ is selected from the group consisting of alkyl, alkylphenyl, hydroxyalkyl, hydroxyalkylphenyl, and mixtures thereof in which the alkyl groups contain from 10 to 18 carbon atoms; n is 2 or 3; t is from 0 to 10, and x is from 1.3 to 10.

Fatty acid saccharide esters and alkoxylated fatty acid saccharide esters may also be suitable for use in the present invention. Examples include, but are not limited to, sucrose esters, such as sucrose cocoate, and sorbitan esters, such as polyoxyethylene(20) sorbitan monooleate and polyoxyethylene(20) sorbitan monolaurate.

The amount of the nonionic surfactant may be up to 20%, up to 15%, up to 10%, from 2% to 10%, from 2% to 9%, from 4% to 8%, or from 4% to 6% by weight of the composition. For example, the weight percent of the nonionic encapsulating surfactant may be 3%, 4%, 5%, 6%, 7%, 8%, 9%, or 10% by weight of the composition, or any range defined between two of such weight percent values.

D. Anionic Surfactant

In an embodiment, the composition can include an anionic surfactant in addition to the encapsulating nonionic surfactant. By way of example, any such anionic surfactant may be included in an amount that is far smaller than the concentration of the included nonionic surfactant, and for a different purpose. For example, while the nonionic surfactant serves to encapsulate the alkanoyl oxybenzene sulfonate peroxide activator, protecting it so as to reduce undesirable premature reaction with the peroxide component, any included anionic surfactant is included for a different purpose, e.g., to enhance the microefficacy performance of the composition, e.g., relative to a given specific target microorganism.

Examples of suitable anionic surfactants include alkyl sulfates (e.g., linear or branched alkyl sulfates such as sodium lauryl sulfate (SLS)). The alkyl chain length may be from 4 to 22, from 6 to 18, from 6 to 16, from 6 to 14, or from 8 to 12 carbon atoms (e.g., $C_3$, $C_4$, $C_6$, $C_8$, $C_{10}$, $C_{12}$, $C_{14}$, $C_{16}$, $C_{18}$, $C_{20}$). Sodium lauryl sulfate is a specific example of such. Additional examples of anionic surfactants that may be included only sparingly, or avoided altogether, include, but are not limited to other alkyl sulfates (e.g., sodium tetradecylsulfate), various sulfonates, disulfonates, and any carboxylate fatty acids, particularly where such include alkyl groups have more than 1, more than 2, more than 3, more than 4, or 8 or more carbon atoms in the alkyl group. Additional examples may include alkyl sulfonates (e.g., $C_6$-$C_{18}$ linear or branched alkyl sulfonates such as sodium octane sulfonate and sodium secondary alkane sulfonate, alkyl ethoxysulfates, fatty acids and fatty acid salts (e.g., $C_6$-$C_{16}$ fatty acid soaps such as sodium laurate), and alkyl amino acid derivatives. Other anionic examples may include sulfate derivatives of alkyl ethoxylate propoxylates, alkyl ethoxylate sulfates, alpha olefin sulfonates, $C_6$-$C_{16}$ acyl isethionates (e.g. sodium cocoyl isethionate), $C_6$-$C_{18}$ alkyl, aryl, or alkylaryl ether sulfates, $C_6$-$C_{18}$ alkyl, aryl, or alkylaryl ether methyl-sulfonates, $C_6$-$C_{18}$ alkyl, aryl, or alkylaryl ether carboxylates, sulfonated alkyldiphenyloxides (e.g. sodium dodecyldiphenyloxide disulfonate), and the like.

For example, the anionic surfactant may be present, if at all, in an amount of no more than 0.5%, no more than 0.4%, or no more than 0.3% by weight of the composition. In an embodiment, the anionic surfactant may be present in an amount from 0.05% to 0.5%, from 0.1% to 0.4%, or from 0.2% to 0.3% by weight of the composition.

As the nonionic surfactant makes up the vast majority of any included surfactant package, the ratio of nonionic surfactant to anionic surfactant may be at least 5:1, at least 10:1, such as from 5:1 to 50:1, or from 10:1 to 40:1, or from 15:1 to 30:1, or from 15:1 to 25:1.

Zwitterionic surfactants that are to be avoided may include, but are not limited to those containing nitrogen (e.g., many zwitterionic surfactants contain nitrogen). Examples of zwitterionic surfactants include but are not limited to amine oxides, sarcosinates, taurates and betaines.

Examples of cationic surfactants that are to be avoided may include, but are not limited to monomeric or other quaternary ammonium compounds, and monomeric or other biguanide compounds.

Disclosure of various other surfactants (suitable classes and those to be avoided) may be found in one or more of U.S. Pat. No. 3,929,678 to Laughlin, U.S. Pat. No. 4,259,217 to Murphy, U.S. Pat. No. 5,776,872 to Giret et al., U.S. Pat. No. 5,883,059 to Furman et al., U.S. Pat. No. 5,883,062 to Addison et al., U.S. Pat. No. 5,906,973 to Ouzounis et al., and U.S. Pat. No. 4,565,647 to Llenado. Each of the above patents is herein incorporated by reference in its entirety.

E. Acid-Stable Thickeners

The treatment composition may include a thickener to increase the viscosity of the composition. While it may in theory be possible to thicken a composition with surfactants, the present inventors found that attempts to achieve such with the present compositions including peroxide and the peroxide activator resulted in formulations that were not clear, but became hazy (i.e., lacked overall desired stability characteristics). As such, other mechanisms can be used to thicken the compositions. Any included thickener will be stable under the acidic conditions of the composition. Such thickened, altered rheology may aid the composition in remaining on a location of a fabric were sprayed, dispensed, or otherwise placed when used as a pre-treatment. For example, a "runny", or "thin" treatment composition may have difficulty remaining in place, in contact with the stain being treated, particularly when used as a pre-treatment, where treatment occurs outside of the typical diluting wash water. Examples of thickeners include, but are not limited to acid stable polysaccharide gums, such as xanthan gum. Other gums may also be suitable for use, e.g., such as gum arabic, gum ghatti, gum tragacanth, karaya gum, guar gum, locust bean gum, beta-glucan, chicle gum, dammar gum, glucomannan, mastic gum, psyllium gum, spruce gum, tara gum, gellan gum, carrageenan, and combinations of gums.

In an embodiment, cellulosic thickeners, such as hydroxyethyl cellulose and hydroxypropyl cellulose are not present, as such thickeners may not be stable under the acidic conditions of the present compositions. Other thickeners which are not stable in the formulation are also not included. For example, acrylate thickeners, as well as various associative thickeners are not included. Associative thickeners are polymeric thickeners of relatively high molecular weight (e.g., greater than 1,000, greater than 5,000, up to 100,000 or even higher), which include hydrophobic and hydrophilic moieties. Such associative thickeners are intended to act to thicken aqueous liquids in which a hydrophobic component has been dispersed.

The amount of the thickener, where included, may be up to 2%, up to 1.5%, up to 1%, up to 0.75%, up to 0.5%, from 0.01% to 1%, from 0.1% to 1%, from 0.15% to 0.75%, from 0.15% to 0.5%, or from 0.2% to 0.3%. For example, the thickener may be included in an amount of 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, or within any range defined between two of any of the foregoing values.

The thickener and other components included may result in a treatment composition of moderate viscosity. In an embodiment, the viscosity may be at least 30 centipoise, at least 50 centipoise, at least 100 centipoise, no more than 5,000 centipoise, no more than 3,000 centipoise, no more than 2000 centipoise, from 150 centipoise to 2,000 centipoise, or from 150 centipoise to 500 centipoise.

F. pH Adjusting Agents

The present treatment compositions may include one or more pH adjusting agents. In an embodiment, the pH adjusting agent may be an organic or inorganic acid. Where an acid is included, its inclusion is primarily for adjusting pH, rather than for another purpose (e.g., sanitization). The compositions may have a pH within a range from 2 to 5, from 2 to 4.5, from 3 to 4, at least 2, at least 3, not more than 5, not more than 4.5, or not more than 4. For example, the pH may be any value between the above values, or within any ranges defined between any two of such pH values.

Any of various organic and inorganic acids may be suitable for use. The most common organic acids include but are not limited to, carboxylic acids, sulfonic acids, and combinations thereof. Organic acids are typically weak acids that usually do not completely dissociate in water. Common inorganic acids include but are not limited to sulfuric acid. Any of these acids may be used as pH adjusting agents.

Various carboxylic acids may be suitable for use, including citric acid, tartaric acid, malic acid, mandelic acid, oxalic acid, glycolic acid, lactic acid, acetic acid, and combinations thereof. Sulfonic acids corresponding to any of the above carboxylic acids may also be used (e.g., where the carboxylic acid group is replaced with a sulfonic acid group). Because the compositions include such acids for pH adjustment (rather than sanitization or other purposes), the concentration of any included pH adjusting agent may be less than 5%, less than 4%, less than 3%, less than 2%, less than 1%, less than 0.5%, or less than 0.2% by weight, such as from 0.001% to 1%, from 0.005% to 0.5%, from 0.01% to 0.5%, or from 0.05% to 0.2% by weight. For example, the pH adjusting agent may be included in an amount of 0.01%, 0.02%, 0.03%, 0.04%, 0.05%, 0.06%, 0.07%, 0.08%, 0.09%, 0.1%, 0.15%, 0.2%, 0.25%, 0.3%, 0.35%, 0.4%, 0.45%, or 0.5%, or within any range defined between two of any of the values mentioned above.

G. Polymeric Anti-Redeposition Agents

The compositions may include an anti-deposition agent or suspension agent. With respect to any polymeric anti-redeposition agent, while such component may technically typically be a cationic polymer, this component is not added as a cationic surfactant (and is not a monomeric cationic species, such as a quaternary amine surfactant), but is added for purpose (as an anti-redeposition agent), if present at all. In embodiments free of cationic surfactants (or other named classes of surfactants), it is meant that no components included for surfactant purposes are cationic (e.g., no monomeric quaternary amines or the like).

Such a polymeric anti-redeposition agent minimizes or prevents soils and stains loosened from the fabric (e.g., by the nonionic surfactant or otherwise) from redepositing on the fabric. In an embodiment, the anti-redeposition agent is a polymer, such as an ethoxylated polyethyleneimine polymer. Exemplary ethyoxylated polyethyleneimine polymers may be derived from ethylene imine. Examples of such include the SOKALAN® HP series of polymers, such as SOKALAN® HP 20, available from BASF® Corporation.

Any polymeric anti-redeposition agent may be included in an amount of less than 5%, less than 4%, less than 3%, less than 2%, or less than 1%, such as from 0.01% to 2%, from 0.1% to 1%, or from 0.3% to 0.8%, or any value or range defined between two of such weight percent values.

H. Other Components

As will be apparent, the treatment compositions may optionally include an optical brightening agent, an enzyme that is stable in the presence of the acid, peroxide, and other components, a hydrotrope, a fragrance or perfume, a dye, colorant or pigment, a stain and soil repellant, a lubricant, a solubilizing agent, a stabilizer, a defoamer, a preservative, a buffer, and combinations thereof. Any of such components may also specifically be absent from the compositions. Where included, such components may typically individually comprise no more than 3%, no more than 2%, no more than 1%, no more than 0.5%, no more than 0.25% or no more than 0.1% of the composition by weight.

The compositions may be compatible with and intended for typical use with detergent compositions for through the wash usage. For example, in some embodiments, a consumer may use the treatment composition as a pre-treatment or added to the wash water, and may also add a laundry detergent composition to the wash water as well. Because the compositions do not include chlorine oxidants, or any oxidants other than the peroxide, they exhibit a very high compatibility across a wide variety of fabrics, of any color, dyed with any dye.

IV. Examples

Example 1

An exemplary aqueous treatment composition was prepared by combining the components as shown in Table 1 below. The composition of Example 1 had a pH of less than 4.

TABLE 1

| Component | Wt. % Active | Purpose |
|---|---|---|
| water | Balance | carrier |
| xanthan gum | 0.28 | thickener |
| NOBS | 0.75 | peroxide activator |
| alkoxylate surfactant (LUTENSOL ® XL 80) | 5.00 | surfactant/encapsulation/soil removal |
| ethoxylated polyethylene imine (SOKALAN ® HP 20) | 0.52 | anti-redeposition agent |
| disodium distyrylbiphenyl disulfonate | 0.01-1 | optical brightener |
| citric acid | q.s. | pH adjustment |
| peroxide | 11.11 | sanitization |

The formula of Example 1 showed stable peroxide levels after 2 weeks, even stored at 49° C., indicating that the composition should remain stable under ambient temperature storage conditions for at least 3, 6, 9, or 12 months. The formula provided comparable "before your eyes" pretreatment and through the wash stain removal treatment as Liquid Clorox 2®, while also being effective against *Staphylococcus aureus*. For example, such a formula provides microefficacy results such as that shown below, when used "through the wash" in a top load (TL) or high efficiency (HE) washer. All such testing as described herein is conducted in accordance with ASTM E2274 (for top load washers) and ASTM E2406 (for high efficiency washers).

TABLE 2

| Dilution | Peroxide ppm | Percent Reduction |
|---|---|---|
| HE | 173 | >99.8 |
| TL | 190 | >99.99 |

The wash performance of a formulation such as that of Example 1 was compared against use of Arm & Hammer® detergent used in combination with Liquid Clorox 2®. Example formulations both with and without the anti-redeposition agent were tested. All comparisons are as compared to use of Arm & Hammer® detergent alone, at a 95% confidence interval. A value of "1" indicates improved stain removal, a value of "2" indicates parity performance, and a value of "3" indicates decreased stain removal performance. The results are shown in Table 3 below.

TABLE 3

| | Through The Wash | | | Pre-Treatment | | |
|---|---|---|---|---|---|---|
| Stain | A&H + LC2 | A&H + NOBS/ Peroxide | A&H + NOBS/ Peroxide + Anti-redeposition Agent | A&H + LC2 | A&H + NOBS/ Peroxide | A&H + NOBS/ Peroxide + Anti-redeposition Agent |
| Grass | 2 | 1 | 1 | 1 | 1 | 1 |
| Coffee | 2 | 2 | 2 | 1 | 1 | 1 |
| Tea | 1 | 2 | 2 | 1 | 1 | 1 |
| Red Wine | 2 | 2 | 2 | 1 | 1 | 1 |
| Blueberry | 2 | 2 | 2 | 1 | 1 | 1 |
| Spaghetti Sauce | 2 | 1 | 1 | 2 | 1 | 2 |
| Chocolate Syrup | 2 | 2 | 2 | 2 | 2 | 2 |
| Mustard | 2 | 1 | 1 | 1 | 1 | 1 |
| Gravy | 2 | 2 | 2 | 1 | 2 | 1 |

TABLE 3-continued

| | Through The Wash | | | Pre-Treatment | | |
|---|---|---|---|---|---|---|
| Stain | A&H + LC2 | A&H + NOBS/ Peroxide | A&H + NOBS/ Peroxide + Anti-redeposition Agent | A&H + LC2 | A&H + NOBS/ Peroxide | A&H + NOBS/ Peroxide + Anti-redeposition Agent |
| Ball Point Pen Ink | 2 | 2 | 2 | 1 | 1 | 1 |
| Sebum | 2 | 2 | 2 | 1 | 1 | 1 |
| Clay Bandy | 2 | 2 | 2 | 1 | 2 | 2 |
| Grape Juice | 2 | 3 | 3 | 1 | 1 | 1 |
| Make Up | 2 | 2 | 2 | 2 | 2 | 2 |
| DMO | 2 | 2 | 1 | 2 | 1 | 1 |

Examples 2-20

Additional exemplary aqueous treatment compositions were prepared by combining the components as shown in Table 4 below. Each composition had a pH below 5, more typically below 4, such as from 3 to 4.

TABLE 4

| Example | Xanthan Gum | Lutensol XL | Brightener | NOBS | SLS | SOKALAN ® HP 20 | Trilon M | Citric Acid | Peroxide | Water |
|---|---|---|---|---|---|---|---|---|---|---|
| 2a | 0.25 | 5 | 0.01-1 | 0.75 | 0 | 0 | 0 | 0.1 | 3 | Bal. |
| 2b | 0 | 5 | 0.01-1 | 0.75 | 0 | 0 | 0 | 0.1 | 3 | Bal. |
| 3 | 0.25 | 5 | 0.01-1 | 0.75 | 0 | 0 | 0.4 | 0.1 | 3 | Bal. |
| 4 | 0.25 | 5 | 0.01-1 | 1 | 0 | 0 | 0 | 0.1 | 3 | Bal. |
| 5 | 0.25 | 5 | 0.01-1 | 1.4 | 0 | 0 | 0 | 0.1 | 3 | Bal. |
| 6 | 0.25 | 5 | 0.01-1 | 0.75 | 0.5 | 0 | 0 | 0.1 | 3 | Bal. |
| 7 | 0.25 | 5 | 0.01-1 | 0.75 | 0.5 | 0.4 | 0 | 0.1 | 3 | Bal. |
| 8 | 0.25 | 5 | 0.01-1 | 0.75 | 0 | 0 | 0 | 0.1 | 3 | Bal. |
| 9 | 0.25 | 5 | 0.01-1 | 0.75 | 0.5 | 0 | 0 | 1 | 3 | Bal. |
| 10 | 0.25 | 5 | 0.01-1 | 1.4 | 0 | 0 | 0 | 0.1 | 2 | Bal. |
| 11 | 0.25 | 5 | 0.01-1 | 1.4 | 0 | 0 | 0 | 0.1 | 1 | Bal. |
| 12 | 0.25 | 5 | 0.01-1 | 0.75 | 0 | 0 | 0 | 0.1 | 1 | Bal. |
| 13 | 0.25 | 0 | 0.01-1 | 0.75 | 0.5 | 0.4 | 0 | 0.1 | 3 | Bal. |
| 14 | 0.25 | 4 | 0.01-1 | 0.75 | 0.5 | 0.4 | 0 | 0.1 | 3 | Bal. |
| 15 | 0.25 | 5 | 0.01-1 | 1.4 | 0.5 | 0 | 0 | 0.1 | 2 | Bal. |
| 16 | 0.25 | 5 | 0.01-1 | 1.25 | 0.5 | 0 | 0 | 0.1 | 2 | Bal. |
| 17 | 0.25 | 5 | 0.01-1 | 1.25 | 0.5 | 0 | 0 | 0.1 | 3 | Bal. |
| 18 | 0.25 | 5 | 0.01-1 | 1.25 | 0 | 0 | 0 | 0.1 | 3 | Bal. |
| 19 | 0.25 | 5 | 0.01-1 | 1.25 | 0 | 0 | 0 | 0.1 | 2 | Bal. |
| 20 | 0.25 | 5 | 0.01-1 | 1.25 | 0.25 | 0 | 0 | 0.1 | 3 | Bal. |

Examples 21-42

Additional exemplary aqueous treatment compositions were prepared by combining the components as shown in FIG. 1, which formulations were tested for their temperature stability and phase stability. Unless otherwise indicated, each formula included a ratio of NOBS:peroxide of 1:3 with 3% peroxide by weight, and 1% NOBS by weight. The formulations in FIG. 1 illustrate incompatibilities of various components, e.g., chelating agents such as Trilon M, quaternary amines, anionic surfactants, effect of pH, etc.

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

The invention claimed is:

1. A liquid antimicrobial laundry treatment composition that is stabilized without the use of phosphorus-containing components, the composition consisting of:

(a) about 0.1% to about 10% by weight of a peroxide;

(b) about 0.5% to about 2' by weight, of an alkanoyl oxybenzene sulfonate peroxide activator;

(c) about 2% to about 10% by weight of a nonionic alkoxylated alcohol surfactant with a cloud point above about 45° C.;

(d) about 0.05% to about 0.5% by weight of an anionic surfactant;

(e) an organic or inorganic acid pH adjusting agent;

(f) at least about 85% by weight water;

(g) wherein the composition has a pH of about 5 or less;

(h) optionally, one or more of a polysaccharide gum thickener that is stable in acidic conditions, an optical brightener, a polymeric suspension agent, an enzyme, a dye, colorant or pigment, a fragrance or perfume, a solvent, a co-surfactant, a hydrotrope, a stain and soil repellant, a lubricant, a solubilizing agent, a stabilizer, a defoamer, a preservative, or a buffer;

(i) wherein the composition provides at least about a 3 log reduction against a bacterial population when used "through the wash"; and (j) wherein the composition provides at least about 80% peroxide stability over a period of at least about 6 months.

2. The composition of claim 1, wherein the composition has a pH of about 4 or less.

3. The composition of claim 1, wherein the anionic surfactant is present at no more than about 0.3% by weight.

4. The composition of claim 1, wherein the composition further comprises a peroxide-stable enzyme.

5. The composition of claim 1, wherein the composition comprises a polysaccharide gum thickener.

6. The composition of claim 5, wherein the comprises xanthan gum.

7. The composition of claim 1, wherein the pH adjusting agent comprises citric acid.

8. The composition of claim 1, wherein the pH of the composition is from about 2 to about 4.

9. The composition of claim 1, wherein the alkanoyl oxybenzene sulfonate includes an alkyl chain length of about $C_4$ to about $C_{18}$.

10. The composition of claim 1, wherein the nonionic surfactant is an alkyl polyethylene glycol ether derived from a $C_{10}$ Guerbet alcohol and at least one alkylene oxide.

11. The composition of claim 1, further comprising an optical brightener.

* * * * *